United States Patent Office 3,462,528
Patented Aug. 19, 1969

3,462,528
DIETHERS OF HELVETICOSIDE AND HELVETICOSOL
Wolfgang Voigtlander, Viernheim, Hesse, Fritz Kaiser, Lampertheim, Hesse, and Wolfgang Schaumann and Kurt Stach, Mannheim-Waldhof, Germany, assignors to C. F. Boehringer & Soehne GmbH., Mannheim-Waldhof, Germany, a corporation of Germany
No Drawing. Filed Dec. 18, 1967, Ser. No. 691,177
Claims priority, application Germany, Dec. 22, 1966, B 90,418
Int. Cl. A61k 27/00; C07c 173/02
U.S. Cl. 424—182    11 Claims

ABSTRACT OF THE DISCLOSURE

Diethers of helveticoside and helveticosol having the formula:

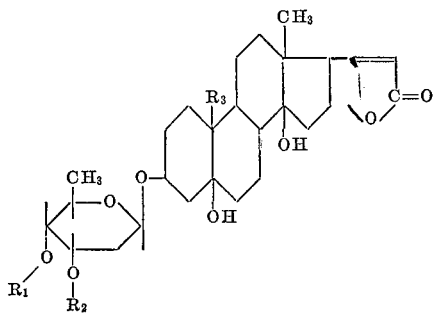

wherein $R_1$ and $R_2$ are each an alkyl, alkenyl or alkynyl group containing up to 4 carbon atoms or such group substituted by an alkoxy group containing up to 3 carbon atoms and $R_3$ is an aldehyde or methylol group or an acylated methylol group.

The above diethers of helveticoside and helveticosol are useful chemotherapeutic agents because of their effectiveness in treating cardiac disturbances. The compounds are easily absorbed from the alimentary tract and are preferably formulated in a form suitable for oral administration.

---

This invention relates to compositions of matter classified in the art of chemistry as diethers or helveticoside and helveticosol and to processes of making and using such compositions.

The novel diethers of this invention are compounds represented by the folowing formula:

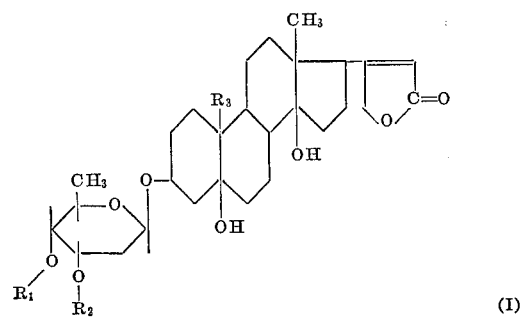

wherein $R_1$ and $R_2$, which may be the same or different, are each unsubstituted or substituted alkyl, alkenyl or alkynyl containing up to 4 carbon atoms, wherein said substitutent is alkoxy containing up to 3 carbon atoms, and $R_3$ is aldehyde, methylol or acylated methylol.

It is known that helveticoside and its reduction product, helveticosol, as well as the 3'-monomethyl ethers thereof, i.e., cymarin and cymarol, possess, upon intravenous administration to animals or humans, a very strong cardiac action which is comparable with that of strophanthine. However, as in the case of strophanthtine, when the helveticoside or helevticosol is administered orally, the same are only very slightly active, only a small percentage thereof being absorbed from the alimentary tract.

In accordance with the invention, it has now been surprisingly found that derivatives of the above glycosides in which the two free hydroxyl groups in the 3,4-position of the digitoxose have been etherified in the manner indicated above in formula (I), are substantially completely absorbed from the alimentary tract and exhibit a very good enteral efficiency as evidenced by clinical evaluation. As a result, they are suitable for use as "oral strophanthines" in the treatment of cardiac insufficiencies.

The novel diethers according to the present invention can be prepared by procedures known to those skilled in the art. According to one procedure the diethers are made by reacting compounds of the formula:

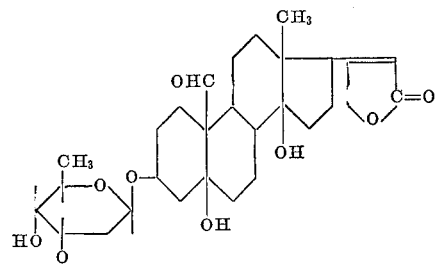

in which $R_4$ is hydrogen or has the same meaning as given for $R_2$ above, with a compound of the formula:

in which $R_1$ has the same meaning as given above and Y is a reactive reesidue which can easily be split off, thereafter those compounds (I) which are obtained in which $R_3$ is an aldehyde are, if desired, then reduced to the corresponding methylol compounds, and, if desired, thereafter acylated to provide the corresponding acylated methylol compounds.

As instances of reactive residues Y which can easily be split off, it is particularly preferred to use halogen alkyl-sulfate or diazo groups. As a result, the compounds (III) are preferably alkyl halides, dialkyl sulfates and diazo-alkanes and the corresponding alkenyl and alkynyl compounds, as well as those compounds in which the alkyl, alkenyl or alkynyl radical is substituted by alkoxy containing up to 3 carbon atoms.

The procedure for preparing the new diether compounds according to the present invention can be carried out for example, as follows: The compounds (II) are mixed in the presence of a base, possibly with slight warming, with a halide or sulfate (III) and the reaction mixture thereafter worked up in the conventional manner. However, those reaction conditions must be avoided in which the compounds (I) or (II) come into contact with mineral acids or other strong aqueous acids since the digitoxose will thereby be split off.

According to a variation of the process for the preparation of the new compounds according to the present invention, the compound (II) is reacted with an appropriate diazo compound in the presence of a mild acidifying catalyst, such as boric acid, a trialkyl ester of boric acid, aluminum isopropylate or, and preferably, ferric chloride. However, in this case, it should be borne in mind that some of the frequently used acidification catalysts, such as boron trifluoride, are too acidic and give rise to a large extent, to the formation of decomposition products.

The subsequent optical reduction of the aldehyde group to the methylol group is preferably carried out by the procedure described in German patent specification No. 1,114,188 as for example, with a complex metal hydride, such as sodium boro-hydride or with aluminum isopropylate.

The compounds (II) used as starting materials are known insofar as $R_4$ is hydrogen or methyl. The remaintaining 3'-monoethers are obtained as intermediates or exclusively by the reaction of helveticoside with a compound (III) as set out above provided that the reaction conditions used are as mild as possible. This reaction is of particular importance for the preparation of mixed ethers, i.e., compounds (I) in which $R_1$ and $R_2$ are not the same.

The subsequent acylation of the methylol group is carried out with usual acylating agents, such as acid anhydrides, acid imidazolides, acid chlorides in pyridine, free acids and p-toluene-sulfochloride in pyridine, etc. The acyl groups may contain up to 4 carbon atoms, and can be substituted by halogen, lower alkoxy, alkenoxy or acyloxy.

This invention is further illustrated by the following examples which diclose the preparation of illustrative compounds useful in this invention.

Example 1.—Helveticoside-3',4'-dimethyl ether

Variant A 2 g. helveticoside were dissolved in a 25 ml. dimethyl formamide and, following the addition of 3.6 g. barium oxide and 3.6 g. barium hydroxide thereto, mixed dropwise at ambient temperature, while stirring, with 8 ml. dimethylsulfate. After the internal temperature had increased to 50–65° C., the reaction mixture was cooled and stirred for a further 30 minutes. The reaction mixture was then diluted with 250 ml. chloroform, filtered with suction and the filtrate washed with water. Following the addition of 2 g. calcium carbonate, the organic phase was evaporated in a vacuum, the residue dissolved in benzene, filtered over silica gel and then washed with ethyl acetate. The ethyl acetate filtrate was evaporated in a vacuum and the residue crystallized from chloroform-ether-petroleum ether. There were thusly obtained 1.75 g. helveticoside-3', 4'-dimethyl ether; M.P. 113–115° C.

Variant B 2 g. cymarin were, according to the procedure described in Example 1A, dissolved in 25 ml. dimethyl formamide and, after the addition of 3.6 g. barium oxide and 3.6 g. barium hydroxide thereto, mixed dropwise with 8 ml. dimethyl sulfate and the resulting reaction mixture worked up. There were thusly obtained 1.7 g. helveticoside-3',4'-dimethyl ether; M.P. 113–116° C.

Variant C 1 g. helveticoside and 300 mg. ferric chloride were dissolved in 20 ml. methylene chloride and, while stirring, mixed dropwise at a temperature of 5–10° C. over a period of one hour with 50 ml. of a 3% solution of diazomethane in methylene chloride. After stirring for a further 30 minutes, the reaction mixture was diluted with water and shaken out with chloroform. The chloroform phase was dried over anhydrous sodium sulfate, evaporated in a vacuum and, in order to separate off by-products, subjected to a multiplicative distribution with the phase mixture chloroform-benzene-methanol-water (1:3:2:2). The organic phase yielded, after evaporation and crystallization of the residue from the chloroform-ether-petroleum ether, 350 mg. helveticoside-3',4'-dimethyl ether; M.P. 112–114° C.

Example 2.—Helveticosol-3',4'-dimethyl ether 2 g. helveticoside-3',4'-dimethyl ether prepared according to Example 1 were dissolved in 90 ml. dioxan which contained 20% water, mixed with 450 mg. sodium borohydride and allowed to stand for 4 hours at ambient temperature. There after 2N sulfuric acid was added until the pH value amounted to 6. The reaction mixture was then diluted with 400 ml. water, extracted with chloroform, the chloroform phase washed with a solution of sodium carbonate and water, dried over anhydrous sodium sulfate and evaporated. For separating off the by-products, a multiplicative separation with the phase mixture choloroform-benzene-methanol-water (1:3:2:2) was carried out. The organic phase yielded after evaporation and crystallization of the residue from chloroform-ether petroleum ether, 1.72 g. helveticosol-3',4'-dimethyl ether; M.P. 164–168° C.

Example 3.—Helveticoside-3',4'-diethyl ether 2 g. helveticoside were dissolved in 25 ml. dimethyl formamide, as described in Example 1A, reacted with 8 ml. diethyl sulfate and worked up. Following crystallization from chloroform-ether-petroleum ether, there were recovered 1.68 g. helveticoside-3',4'-diethyl ether; M.P. 138–142° C.

Example 4.—Helveticoside-3',4'-di-(methoxymethyl) ether 2 g. helveticoside were dissolved in 20 ml. dimethyl formamide and 10 ml. dimethyl-aniline, mixed with 5 g. chloromethyl methyl ether and warmed at 40° C. for 24 hours. The reaction mixture was thereafter diluted with water, extracted first with petroleum ether and then with chloroform, the chloroform phase evaporated in a vaccum, the residue dissolved in benzene-ethyl acetate (9:1) and fractionated over silica gel. The evaporation residues of the benzene-ethyl acetate (7:3) fractions yielded, after recrystallization from chloroform-ether-petroleum ether, 1.47 g. helveticoside-3',4'-di-(methoxymethyl) ether; M.P. 91–93° C.

Example 5.—Helveticosol-3',4'-di-(ethoxymethyl) ether 2 g. helveticoside and 5 g. chloromethyl ethyl ether were dissolved in 20 ml. dimethyl formamide and 10 ml. dimethylaniline, reacted according to the method described in Example 4 and the reaction mixture further worked up. The crude product (1.8 g. helveticoside-3',4'-di-(ethoxymethyl) ether) was dissolved in dioxan containing 20% water and reduced with sodium borohydride according to the method described in Example 2. The product which was obtained was recrystallized from chloroform-ether-petroleum ether. There were thusly obtained 1.46 g. helveticosol-3',4'-di-(ethoxymethyl) ether; M.P. 83–85° C.

Example 6.—Helveticosol-3',4'-di-(methoxymethyl) ether 1 g. helveticoside-3',4'-di-(methoxymethyl) ether (Example 4) were dissolved in 40 ml. dioxan containing 20% water, mixed with 225 mg. sodium borohydride and allowed to stand for 4 hours at ambient temperature. Thereafter 2 N sulfuric acid was added until the pH amounted to 6, the reaction mixture diluted with 200 ml. water, extracted with chloroform, the chloroform phase washed with sodium carbonate solution and water, dried over anhydrous sodium sulfate and evaporated. The resulting residue was recrystallized from chloroform-ether-petroleum ether. There were thusly obtained 770 mg. helveticosol-3',4'-di-(methoxymethyl) ether; M.P. 97–99° C.

Example 7.—19-O-acetyl-helveticosol-3',4'-dimethyl ether 1 g. helveticosol-3',4'-dimethyl ether (Example 2) was dissolved in 10 ml. pyridine, mixed with 5 ml. acetic anhydride and allowed to stand for 8 hours at room temperature. The reaction mixture was thereafter diluted with ten times the amount of water and extracted wtih chloroform. The chloroform phase was washed with 1 N sulfuric acid and water, dried over anhydrous sodium sulfate and evaporated in a vacuum. The crude product which was recovered was crystallized from acetone-petroleum ether. There were thusly obtained 730 mg. 19-O-acetyl-helveticosol-3',4'-dimethyl ether; M.P. 159–163° C.

Example 8.—19-O-ethoxyacetyl-helveticosol-3',4'-dimethyl ether 1 g. helveticosol-3',4'-dimethyl ether was dissolved in 10 ml. pyridine, cooled in ice and the solution added to an ice-cooled mixture of 900 mg. ethoxy acetic acid, 20 ml. pyridine and 3 g. p-toluene-sulfochloride. The resulting reaction mixture was permitted to stand, with ice cooling, for 60 minutes, then diluted with 400 ml. water, extracted with chloroform, evaporated and the crude product, dissolved in benzene-ethyl acetate (10%) and fractionated over silica gel with benzene-ethyl acetate (10–50%). There were recovered from the benzene +40% ethyl acetate fraction, after crystallization from chloroform-ether-petroleum ether, 640 mg. 19-O-ethoxyacetyl-helveticosol-3',4'-dimethyl ether; M.P. 79–82° C.

Example 9.—19-O-propionyl-helveticosol-3',4'-dimethyl ether 1 g. helveticosol-3',4'-dimethyl ether was dissolved in 10 ml. pyridine, mixed with 5 ml. propionic anhydride and allowed to stand for 24 hours at room temperature. The reaction mixture was then further worked up by the procedure described in Example 7. Following crystallization from chloroform-ether-petroleum ether, there were obtained 760 mg. 19-O-propionyl-helveticosol-3',4'-dimethyl-ether; M.P. 148–152° C.

Example 10.—19-O-chloroacetyl-helveticosol-3',4'-dimethyl ether 1 g. helveticosol-3',4'-dimethyl ether was dissolved in 10 ml. pyridine, reacted with 1.8 g. monochloro acetic acid and 6 g. p-toluene-sulfochloride in 40 ml. pyridine according to the procedure disclosed in Example 8 and the resulting reaction mixture worked up by the same method. After crystallization from chloroform-ether-petroleum ether, there were obtained 580 mg. 19-O-chloroacetyl-helveticosol-3',4'-dimethyl ether; M.P. 114–117° C.

Helveticoside and helveticosol are highly active glycosides; their effectiveness, however, being limited to their administration by the intnraveous route.

In order to establish the effectiveness of the compounds of the invention when administered by the oral route, i.e., that the compounds of the invention were readily absorbed from the alimentary tract, a series of experimental procedures were carried out.

The criterion which was selected for measuring the effectiveness of the compounds when administered enterally was the length of the period of time elapsing following intraduodenal injection of tested compound in the guinea pig before ventricular extrasystoles and cardiac arrest occurred.

Test Procedure.—Guinea pigs were used which had been subjected to urethane anesthesia. A canula was fixedly inserted into the animals' duodenum above the bile duct juncture. The test compounds were intraduodenally injected in the amounts set forth in the Table which follows. In each case the test compound was given in 10 ml./kg. of an aqueous solution containing 1% methylcellulose and 5% dimethylacetamide. The animals' EKG was observed on an oscilloscope, and it was determined at what exact time the first ventricular extrasystoles occurred. If, for a period of 4 seconds, no EKG could be read, it was considered that cardiac arrest had occurred. An average of 6 guinea pigs were used for each dose level of each substance.

TABLE

| Compound | Ex. No. | Dose (Mg./kg. I.D.) | Time in minutes | |
|---|---|---|---|---|
| | | | Extra-systole | Cardiac arrest |
| Helveticoside | | 5 | 57 (4/6) | 110 (4/6) |
| | | 10 | 20 | 67 |
| Helveticosol | | 5 | 36 (3/6) | 88 (3/6) |
| | | 10 | 27 | 61 |
| Helveticoside-3',4'-dimethyl ether | 1 | 5 | 4 | 11 |
| Helveticoside-3'4'-di-(methoxymethyl) ether | 4 | 5 | 26 | 75 |
| Helveticosol-3',4'-di-(methoxymethyl) ether | 6 | 5 | 12 | 28 |
| Helveticosol-3',4'-di-(ethoxymethyl) ether | 5 | 5 | 10 | 20 |
| Helveticosol-3',4'-dimethyl ether | 2 | 5 | 5 | 12 |
| 19-O-propionyl-helveticosol-3',4'-dimethyl ether | 9 | 5 | 4 | 10 |
| | | 3 | 6 | 17 |
| 19-O-acetyl-helveticosol-3',4'-dimethyl ether | 7 | 3 | 9 | 16 |
| 19-O-ethoxyacetyl-helveticosol-3',4'-dimethyl ether | 8 | 3 | 8 | 24 |

From the table it can be seen that following intraduodenal administration of 5 mg./kc. of helveticoside and helveticosol, only some of the test animals evidenced the poisoning symptoms characteristic of the cardiac gylcosides. The numbers given in the parentheses indicate that number of the test animals who evidenced the above symptoms. Only after intraduodenal administration of 10 mg./kg. of the helveticoside and helveticosol did all of the guinea pigs evidence extrasystoles and did cardiac arrest occur.

In contrast, in each instance, all of the guinea pigs to whom the test compounds, in an amount of 5 mg./kg. were administered intraduodenally evidenced the classic poisoning symptoms. The rapid absorption of the compounds in accordance with the invention is further evidenced by the fact that the time elapsed before occurrence of extrasystoles and cardiac arrest was less than the time required for these happenings with twice the dose of helveticoside and helvetcosol.

One of the aspects of the invention is to provide pharmaceutical compositions containings one or more of the compounds of general formula (I) in admixture with a significant amount of a solid or liquid pharmaceutical carrier for use in the treatment of cardiac disorders and particularly cardiac insufficiency. The compositions may take the form of tablets, powders, capsules or other dosage forms which are suitable for oral administration. In addition, the compositions may be formulated for use as suppositories, in particular, suppositories adapted for rectal administration.

Thus, for instance, solid compositions suitable for oral administration include compressed tablets, pills dispersible powders and granules. In such solid compositions, one or more of the compounds of general formula (I) is or are mixed with at least one inert diluent, such as calcium carbonate, potato starch, corn starch, alginic acid, talc, agar-agar or lactose. Anhydrous sodium sulfate can also be added to protect the acyl radicals present in the active materials from saponification by atmospheric moisture. The compositions may also comprise, as is normal practice, additional substances other than inert diluents, for example, lubricating agents, such as magnesium stearate.

The compositions according to the present invention for oral administration include capsules or absorbable material, such as gelatin, containing one or more of the compounds of general formula (I), with or without the addition of diluents and excipients.

The percentage of active ingredient in the compositions according to the present invention may be varied, it being necessary that it should constitute a proportion such that a suitable dosage is provided so that the desired therapeutic effect is obtained. Obviously, several unit dosage forms may be administered at about the same time. In clinical trials, it has been found that a daily dosage of 1–10 mg. suffices, most patients responding favorably to a daily dosage of 1–5 mg. When such daily dosages are administered to decompensated cardiac patients, a clear improvement in the circulatory condition and in the reduction of edema is observed.

The following examples serve to illustrate pharmaceutical compositions according to the present invention:

Example 11

Tablets were prepared by the conventional tabletting methods containing:

| | mg. |
|---|---|
| Helveticoside-3',4'-dimethyl ether | 1.0 |
| Anhydrous sodium sulfate | 10.0 |
| Lactose | 57.0 |
| Starch | 57.0 |
| Talc | 8.7 |
| Agar-agar | 4.0 |
| Magnesium stearate | 1.0 |
| Citric acid | 1.3 |

Example 12

Tablets were prepared containing:

| | mg. |
|---|---|
| 19-O-acetyl-helveticosal-3',4'-dimethyl ether | 0.2 |
| Anhydrous sodium sulfate | 5.8 |
| Lactose | 114.0 |
| Aerosil | 1.4 |
| Polyglycol 20,000 | 7.0 |
| Talc | 6.6 |
| Methyl cellulose | 3.0 |
| Magnesium stearate | 0.7 |
| Citric acid | 1.3 |

Example 13

Tablets were prepared containing:

| | mg. |
|---|---|
| 19-O-acetyl-helveticosol-3',4'-dimethyl ether | 1.0 |
| Anhydrous sodium sulfate | 5.0 |
| Lactose | 114.0 |
| Polyglycol 20,000 | 7.0 |
| Aerosil | 1.4 |
| Talc | 6.6 |
| Magnesium stearate | 0.7 |
| Methyl cellulose | 3.0 |
| Citric acid | 1.3 |

Example 14

Tablets were prepared containing:

| | mg. |
|---|---|
| 19-O-propionyl-helvetiscosol-3',4'-dimethyl ether | 0.2 |
| Anhydrous sodium sulfate | 4.8 |
| Lactose | 115.0 |
| Polyglycol 20,000 | 7.0 |
| Aerosil | 1.4 |
| Talc | 6.6 |
| Magnesium stearate | 0.7 |
| Methyl cellulose | 3.0 |
| Citric acid | 1.3 |

Example 15

A mixture was prepared consisting of:

| | mg. |
|---|---|
| Helveticosol-3',4'-diethoxymethyl ether | 1.0 |
| Ground nut oil | 100.0 |
| Hydrogenated vegetable oil | 10.0 |
| Soya bean lecithin | 3.0 |

This mixture was used for filling a Scherer capsule.

Example 16

Tablets were prepared containing:

| | mg. |
|---|---|
| Helveticosol-3',4'-dimethyl-ether | 1.0 |
| Potassium dihydrogen phosphate | 2.6 |
| Disodium hydrogen phosphate | 1.3 |
| Lactose | 116.6 |
| Polyvinylpyrrolidone | 7.0 |
| Aerosil | 1.4 |
| Methyl cellulose | 3.0 |
| Talc | 6.3 |
| Magnesium stearate | 0.7 |

Example 17

Ampules were filled with a sterilized solution containing:

| | mg. |
|---|---|
| Helveticosol-3',4'-dimethyl-ether | 0.25 |
| Ethanol (96%) | 0.2 |
| Polyethyleneglycol 400 | 0.2 |
| Trisodium citrate | 1.0 |
| Aqua destillata ad | 2.0 |

Tablets and solutions described in Examples 16 and 17 exhibited a very good efficiency in the clinical treatment of human cardiac insufficiencies.

We claim:

1. A compound having the formula:

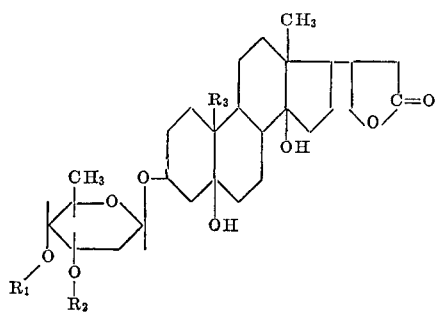

where $R_1$ and $R_2$ are each a member selected from the group consisting of unsubstituted and substituted alkyl, alkenyl and alkynyl containing up to 4 carbon atoms, wherein said substituent is alkoxy containing up to 3 carbon atoms and $R_3$ is a member selected from the group consisting of aldehyde, methylol and acylated methylol wherein acyl designates an aliphatic carboxylic acid radical having up to 4 carbon atoms.

2. A compound according to claim 1 designated helveticoside-3',4'-dimethyl-ether.

3. A compound according to claim 1 designated 19-O-acetyl-helveticosol-3',4'-dimethyl ether.

4. A compound according to claim 1 designated 19-O-ethoxyacetyl-helveticosol-3',4'-dimethyl ether.

5. A compound according to claim 1 designed 19-O-propionyl-helveticosol-3',4'-dimethyl ether.

6. A compound according to claim 1 designated helveticosol-3',4'-diethoxymethyl ether.

7. A compound according to claim 1 designated helivesticosol-3',4'-dimethyl ether.

8. A therapeutic composition comprising a compound according to claim 1 in admixture with a pharmaceutically acceptable carrier in unit dosage form.

9. A therapeutic composition according to claim 8 in dosage unit form suitable for enteral administration.

10. A method of treating a decompensated cardiac mammal which comprises enterally administering a therapeutically effective amount of a compound according to caim 1.

11. A method of treating a decompensated cardiac mammal which comprises enterally administering 1 to 10 mg. of a compound according to claim 1.

References Cited

UNITED STATES PATENTS 3,223,587  12/1965  Wilkinson _____ 260—210.5

OTHER REFERENCES

"Chem. Abst.," vol. 62, 1965, pp. 13223–13224 (a–c).

LEWIS GOTTS, Primary Examiner

J. R. BROWN, Assistant Examiner

U.S. Cl. X.R.

260—210.5

UNITED STATES PATENT OFFICE
CERTIFICATE OF CORRECTION

Patent No. 3,462,528　　　　　　　　　　　　　　　　　August 19, 1969

Wolfgang Voigtlander et al.

It is certified that error appears in the above identified patent and that said Letters Patent are hereby corrected as shown below:

In the heading to the printed specification, lines 4 and 5, "Hesse", each occurrence, should read -- Hessen --; line 11, after "B 90,418" insert -- ; Aug. 25, 1967, B 94,160 --. Column 1, line 22, the lines in the uppermost right part of the structural formula should be closed. Column 2, line 9, "strophanthtine" should read -- strophanthine --; line 37, there should be a connecting line between Q and $R_4$; line 44, "reesidue" should read -- residue --. Column 3, line 38, cancel "a". Column 4, line 13, "There after" should read -- Thereafter --; line 20, "choloroform" should read -- chloroform --. Column 5, line 53, "intnraveous" should read -- intravenous --. Column 6, line 27, "mg./kc." should read -- mg./kg. --; line 44, "helvetcosol" should read -- helveticosol --; line 57, after "pills" insert a comma. Column 7, line 30, "helveticosal" should read -- helveticosol --. Column 8, line 63, "designed" should read -- designated --; line 68, "helivesticosol" should read -- helveticosol --.

Signed and sealed this 2nd day of June 1970.

(SEAL)
Attest:

EDWARD M. FLETCHER, JR.　　　　　　　　　　WILLIAM E. SCHUYLER, JR.
Attesting Officer　　　　　　　　　　　　　　Commissioner of Patents